US008643293B2

United States Patent
Tseng

(10) Patent No.: US 8,643,293 B2
(45) Date of Patent: Feb. 4, 2014

(54) CIRCUIT DEVICE FOR CONTROLLING A PLURALITY OF LIGHT-EMITTING DEVICES IN A SEQUENCE

(76) Inventor: Shen-Ko Tseng, Taipei Hsien (TW)

( * ) Notice: Subject to any disclaimer, the term of this patent is extended or adjusted under 35 U.S.C. 154(b) by 417 days.

(21) Appl. No.: 13/046,393

(22) Filed: Mar. 11, 2011

(65) Prior Publication Data
US 2011/0221353 A1    Sep. 15, 2011

(30) Foreign Application Priority Data

Mar. 11, 2010 (CN) ...................... 2010 2 0128006 U

(51) Int. Cl.
*H05B 37/02* (2006.01)
(52) U.S. Cl.
USPC ..................... 315/200 A; 315/360; 315/362
(58) Field of Classification Search
USPC ............. 315/200 A, 323, 360, 362; 362/103, 362/192, 227, 276, 295, 394, 411, 570
See application file for complete search history.

(56) References Cited

U.S. PATENT DOCUMENTS

| | | | |
|---|---|---|---|
| 6,104,140 A * | 8/2000 | Wu et al. ................... | 315/200 A |
| 6,348,766 B1 * | 2/2002 | Ohishi et al. ............... | 315/200 A |
| 6,789,913 B2 * | 9/2004 | Wei ............................... | 362/103 |
| 7,207,688 B2 * | 4/2007 | Yuen et al. .................... | 362/103 |
| 7,255,468 B2 * | 8/2007 | Capriola ........................ | 362/570 |
| 7,600,884 B2 * | 10/2009 | Vitulli et al. ................. | 362/103 |
| 8,322,876 B2 * | 12/2012 | Tseng et al. .................. | 362/103 |
| 2006/0174521 A1 * | 8/2006 | Lee ................................ | 36/137 |

* cited by examiner

Primary Examiner — Tung X Le

(57) ABSTRACT

The invention provides a circuit device, embedded in an object, which includes a plurality of light-emitting devices, a motion-actuated switch, a controller and a selector. The motion-actuated switch senses a first motion of the object and generates a first controlling signal. The controller selectively drives the plurality of light-emitting devices to emit lights in a first period in a first sequence and a first flashing frequency according to the first controlling signal. After the first period, the motion-actuated switch senses a second motion of the object and generates a second controlling signal. The controller selectively drives the plurality of light-emitting devices to emit lights in a second period in the first sequence and a second flashing frequency according to the second controlling signal. The selector generates a selecting signal and the controller selectively controls the number of lighting light-emitting devices according to the selecting signal.

12 Claims, 6 Drawing Sheets

CIRCUIT DEVICE FOR CONTROLLING A PLURALITY OF LIGHT-EMITTING DEVICES IN A SEQUENCE

BACKGROUND OF THE INVENTION

1. Field of the Invention

The present invention relates to a circuit device, and more particularly, to a circuit device which is capable of controlling a plurality of light-emitting devices to emit light sequentially in accordance with various orders and various light flashing frequencies by a way of programmable design.

2. Description of the Prior Art

With industrial and economic development, the night lighting device provides people could continue the activities at night. It also makes various manufacturers to continuously develop various lighting devices for better lives, such as household lamps, decorative lights or various traffic lights. Due to the technology development, these lighting devices can not only provide traditional lighting feature but also decorate their home or street with lights of different colors for enhancing the festive atmosphere. Therefore, these lighting devices have an inseparable relationship with people's life.

Furthermore, in recent years, light-emitting diodes (LED) have been widely used in various lighting devices and gradually become the mainstream of market. As light-emitting diodes have benefits such as small size, long life and resistance to impact, etc., light-emitting diodes are paid attention by many domestic and international manufacturers.

Because the traditional light-emitting devices or lighting devices typically contain a plurality of light emitting devices, such as light bulbs, light emitting diodes or cold-light emitting device. Most of these light emitting devices will be coupled to the circuit boards and switches. Wherein, the switches are utilized to control these light-emitting units for flashing or the flashing of emitting light or the order of emitting light, which make the light-emitting devices or the lighting devices with different functions. For example, light emitting devices or lighting devices can generate changeable light with different situations at night or be utilized for identity and security purposes through these light-emitting units.

For example, the application of similar light-emitting devices has been disclosed in U.S. Pat. No. 5,709,464. The '464 patent disclosed a traditional light-emitting device comprising a switch coupled to a number of light emitting units (such as light emitting diodes) for controlling or driving the light-emitting units to flash and/or the order of emitting lights.

However, the said light emitting units of the light emitting devices although can be installed in any order or a single pre-set pattern, but the light-emitting units just can be controlled to open or close in a single default order, which often appears to be quite monotonous and unable to attract the attention of users and other people around.

Furthermore, the light-emitting device with light-emitting diodes although can save more power than conventional light-emitting device, but the light-emitting diodes have a fixed light order. The light-emitting device can not be able to change the situation in accordance with the different needs of users, even the situation of atmosphere has different light condition. The light-emitting diodes will flash according to the original order. It always causes the user inconvenience and distress of others, and does not meet the environmental protection trend for saving energy.

SUMMARY OF THE INVENTION

In view of the lacks of the prior art, the present invention discloses a circuit device, which is capable of controlling a plurality of light-emitting devices to emit light sequentially in accordance with various orders and various light flashing frequencies by a way of programmable design, and further controlling a part of the plurality of light-emitting devices to emit light sequentially in accordance with a order and a light flashing frequency according to the need of the user in various condition, which enhances the light-emitting diodes to flash in various ways. Moreover, the circuit device of the invention is close and simple, therefore the circuit device is capable of providing a strong light with saving energy, which meets the environmental protection trend for saving energy.

One embodiment of the present invention provides a circuit device. The circuit device is utilized to be embedded in an object. The circuit device comprises a plurality of light-emitting devices, a motion-actuated switch, a controller and a selector. The motion-actuated switch senses a first motion of the object and generates a first controlling signal. The controller selectively drives the plurality of light-emitting devices to emit lights in a first period in a first sequence and a first flashing frequency according to the first controlling signal.

The motion-actuated switch senses a second motion of the object after the first period and generates a second controlling signal accordingly. The controller selectively drives the plurality of light-emitting devices to emit lights in a second period in accordance with the first order and a second flashing frequency according to the second controlling signal. The second flashing frequency is different from the first flashing frequency. The motion-actuated switch senses a third motion of the object after the second period and generates a third controlling signal accordingly. The controller selectively drives a plurality of light-emitting groups respectively comprising two light-emitting devices to emit lights in a third period in accordance with a second order and a third flashing frequency according to the third controlling signal. The selector generates a selecting signal to the controller.

The controller selectively controls the number of the light-emitting devices to emit lights in the first period and the second period according to the selecting signal. The motion-actuated switch does not have any effect even if the motion-actuated switch senses the motion of the object in the first period, the second period and the third period.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

DETAILED DESCRIPTION OF THE INVENTION

Figure 1:
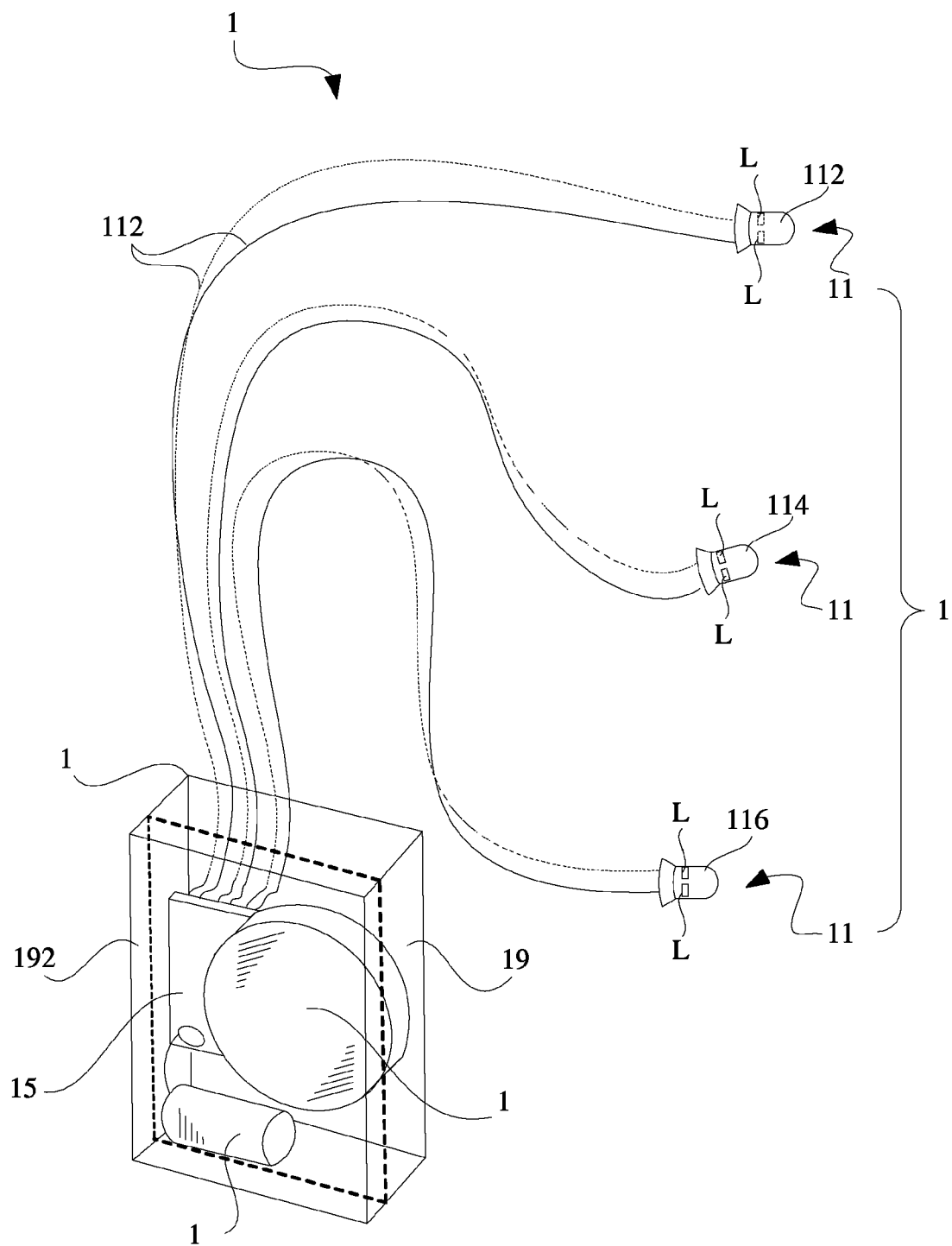
FIG. 1 illustrates a circuit device of an embodiment of the invention.

The present invention provides a circuit device. Please refer to FIG. 1. FIG. 1 illustrates a circuit device of an embodiment of the invention. The circuit device 1 is able to be embedded in an object (the object does not illustrate in FIG. 1), and the circuit device 1 comprises a plurality of light-emitting devices L1~L6, a motion-actuated switch 13, a controller 15, a battery 17 and a water-proof enclosure 19. In practice, the light-emitting devices L1~L6 can be formed by red light emitting diode, blue light emitting diode, green light emitting diode, yellow light emitting diode and any other suitable light emitting diodes.

As shown in FIG. 1, the first light-emitting device L1 and the second light-emitting L2 are disposed in a package 1126 to form a first light-emitting device group 112, which is coupled to the controller 15 by a lead group 1128. The third light-emitting device L3 and the fourth light-emitting L4 are disposed in a package 1146 to form a second light-emitting device group 114, which is coupled to the controller 15 by the lead group 1128. The fifth light-emitting device L5 and the sixth light-emitting device L6 are disposed in a package 1166 to form a third light-emitting device group 116, which is coupled to the controller 15 by the lead group 1128. The light-emitting device group 11 comprises the first light-emitting device group 112, the second light-emitting device group 114 and the third light-emitting device group 116.

In addition, the water-proof enclosure 19 includes a plastic container 194 and an upper plastic cover 192 bonded to the plastic container 194. In the embodiment, the water-proof enclosure 19 is embedded in the object for sealing the motion-actuated switch 13, the controller 15, the battery 17 and a first end of the lead group 1128. The water-proof enclosure 19 ensures that the circuit device 1 is unable to be damped, oxidized and dirtied, and extends the life of the circuit device 1. Furthermore, the water-proof enclosure 19 is able to be formed by the fusion of the upper plastic cover 192 and the plastic container 194 by supersonic wave or laser. In addition, in practice, the water-proof enclosure 19 is able to be formed by injection molding of resin or plastic.

In the embodiment, the battery 17 is utilized to provide the power for the circuit device 1. In practice, it is hypothesized that the first light-emitting device L1 and the second light-emitting device L2 of the first light-emitting device group 112 are a red light emitting diode and a blue light emitting diode respectively. The battery 17 includes at least a two 3V lithium batteries series, therefore the battery 17 is able to provide at least 6 volts, and the positive of the two 3V lithium batteries series is coupled to the positive end of the first light-emitting device L1 and the second light-emitting device L2. The design is needed because the blue light emitting diode light-emitting must be driven by a larger voltage.

It is hypothesized that the first light-emitting device L1 and the second light-emitting device L2 of the first light-emitting device group 112 are a red light emitting diode and a green light emitting diode respectively. The battery 17 includes at least a 3V lithium battery, and the positive of the 3V lithium battery is coupled to the positive end of the first light-emitting device L1 and the second light-emitting device L2. The design is needed because the red light emitting diode and the green light emitting diode light-emitting must be driven by a lower voltage, therefore the 3V lithium battery is able to drive them to emit light.

Figure 2:
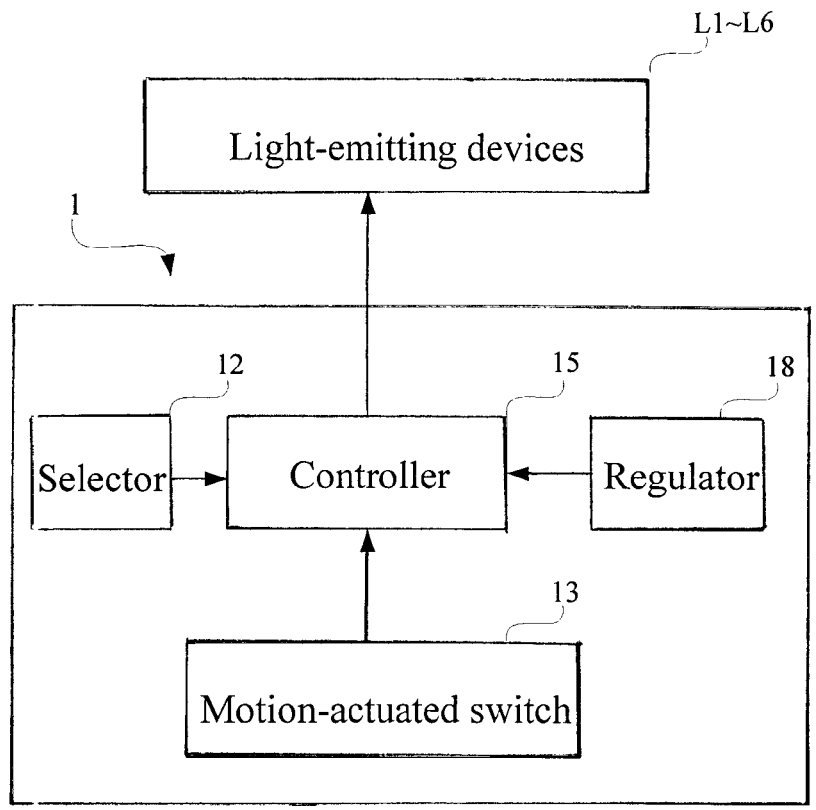
FIG. 2 is a function block of the circuit device.

Please refer to FIG. 2. FIG. 2 is a function block of the circuit device 1. As shown in FIG. 2, the circuit device 1 includes the motion-actuated switch 13, a selector 12 and a regulator 18, and the motion-actuated switch 13. The selector 12 and the regulator 18 are coupled to the controller 15. In the embodiment, the motion-actuated switch 13 is utilized to sense a first motion of the object and generate a first controlling signal accordingly, the controller 15 selectively drives the plurality of light-emitting devices L1~L6 to emit light in a first period in accordance with a first order and a first flashing frequency according to the first controlling signal.

The motion-actuated switch 13 senses a second motion of the object after the first period and generates a second controlling signal accordingly. The controller 15 selectively drives the plurality of light-emitting devices L1~L6 to emit light in a second period according to the second controlling signal. The motion-actuated switch 13 does not have any effect even if the motion-actuated switch 13 senses the motion of the object in the first period and the second period. And so on, the controller 15 is able to respectively drive the plurality of light-emitting devices L1~L6 to emit light in various periods by the motions of the object.

In practice, the time of the second period is able to equal to the time of the first period, but also different from the time of the first period, which depends on the actual needs. In addition, the plurality of light-emitting devices L1~L6 are able to emit light in a second period in accordance with the first order and a second flashing frequency, wherein the second flashing frequency is different from the first flashing frequency, for example, the first flashing frequency and the second flashing frequency are able to be 22 Hz and 5 Hz respectively, that is the first flashing frequency is faster than the second flashing frequency, but not be limited.

Furthermore, the plurality of light-emitting devices L1~L6 are able to emit light in accordance with a second order and the first flashing frequency, wherein the second order is different from the first order, for example, the first order is able to be the order from L1, L2, L3, L4, L5 to L6, and the second order is able to be the order from L1, L3, L5, L2, L4 to L6, but not be limited.

The selector 12 is utilized to generate a selecting signal to the controller 15 by users, the controller 15 selectively controls the number of the plurality of light-emitting devices L1~L6 to emit light in the first period and the second period according to the selecting signal. For example, when the user press the selector 12 at the first time, the selector 12 will send a first selecting signal to the controller 15, the controller 15 is able to control just the light-emitting devices L1 and L2 of the plurality of light-emitting devices L1~L6 to emit light in the first period according to the first selecting signal. When the user presses the selector 12 at the second time, the selector 12 will send a second selecting signal to the controller 15, the controller 15 is able to control all the plurality of light-emitting devices L1~L6 to emit light in the second period according to the second selecting signal, but not be limited.

In addition, the regulator 18 is utilized to generate a regulating signal to the controller 15, the controller 15 selectively regulates the period, the order and the flashing frequency of the plurality of light-emitting devices L1~L6 to emit light according to the regulating signal, but not be limited. In practice, the regulator 18 is able to be a manual switch, a light-sensing switch, a pressure-sensing switch, a voice-sensing switch and any other types of regulating devices, that is unlimited.

Figure 3:
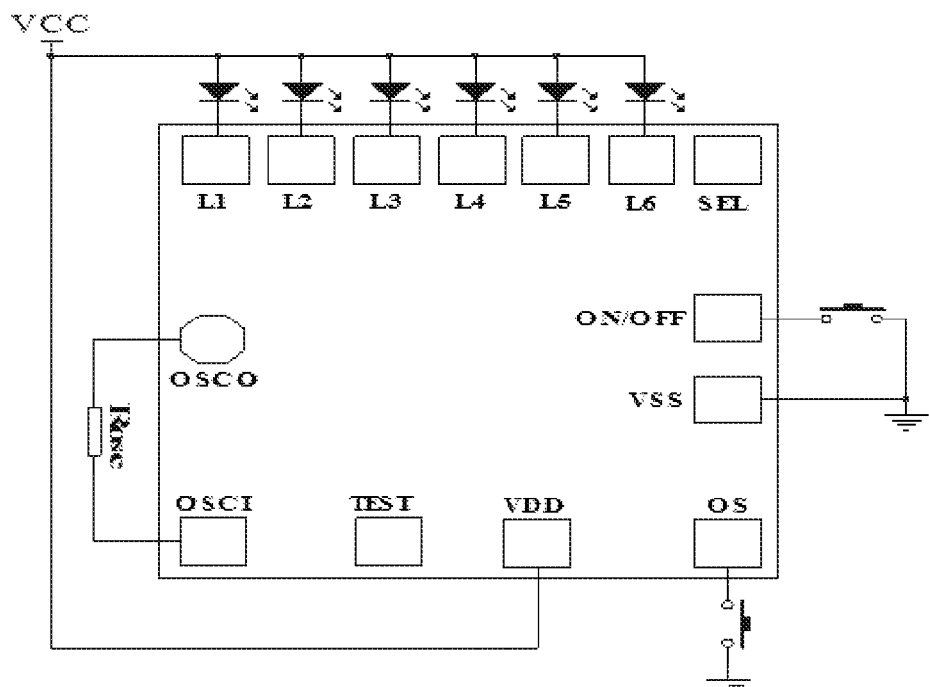
FIG. 3 illustrates pins and an application circuit of the circuit device.

Please refer to FIG. 3. FIG. 3 illustrates pins and an application circuit of the circuit device. As shown in FIG. 3, the symbols L1~L6 at the base of the circuit device stand for the outputs of the plurality of light-emitting devices L1~L6 respectively, VSS stands for the negative of power, OS stands for the motion-actuated switch 13, TEST stands for the test end of the internal circuit, VDD stands for the positive of power, OSCI stands for the oscillation input, OSCO stands for the oscillation output, $R_{OSC}$ stands for the external oscillation resistor, ON/OFF stands for the power switch, SEL stands for selector 12. In the embodiment, when one of the outputs L1~L6 (it can also be explained as the plurality of light-emitting devices L1~L6) is coupled to the SEL or short-circuited, the corresponding light-emitting device is unable to emit light at the first period or the second period, for example, when L1 is coupled to SEL, the corresponding light-emitting device L1 is unable to emit light at the first period and the second period, but the other light-emitting device L2~L6 still flash at the first period and the second period in accordance with the original order and the original frequency. In other words, the controller 15 makes the driving signal of the corresponding light-emitting device L1 to be false and the driving signal of the other light-emitting device L2~L6 remain true.

In another embodiment, the motion-actuated switch 13 senses the motion of the object and generates the first controlling signal, the controller 15 selectively drives the plurality of light-emitting devices L1~L6 according to the first controlling signal for making the plurality of light-emitting devices L1~L6 to emit light at the first period in accordance with the first order and the first flashing frequency. And then, the motion-actuated switch 13 senses the motion of the object again and generates the first controlling signal, the controller 15 selectively drives the plurality of light-emitting devices L1~L6 according to the first controlling signal again for making the plurality of light-emitting devices L1~L6 to emit light at the second period in accordance with the second order and the second flashing frequency. The motion-actuated switch 13 senses the motion of the object again at the third time and generates the first controlling signal, the controller 15 selectively still drives the plurality of light-emitting devices L1~L6 according to the first controlling signal for making the plurality of light-emitting devices L1~L6 to emit light at the third period in accordance with the third order and the third flashing frequency. It is hypothesized that the motion-actuated switch 13 senses the motion of the object again and generates the first controlling signal, the condition goes back to the first time, the controller 15 selectively drives the plurality of light-emitting devices L1~L6 according to the first controlling signal for making the plurality of light-emitting devices L1~L6 to emit light at the first period in accordance with the first order and the first flashing frequency. In the embodiment, when one of the outputs L1~L6 is coupled to the SEL or short-circuited, the corresponding light-emitting device is unable to emit light at the first period or the second period, but unaffected at the third period, for example, when L1 is coupled to SEL, the corresponding light-emitting device L1 is unable to emit light at the first period and the second period, but the other light-emitting device L2~L6 still flash at the first period and the second period in accordance with the original order and the original frequency, and the plurality of light-emitting devices L1~L6 still emit light at the third in accordance with the third order and the third flashing frequency.

Wherein, the external oscillation resistor $R_{OSC}$ is coupled to the oscillation input OSCI and the oscillation output OSCO is used for speeding up the flashing frequency built-in the circuit device.

In addition, when the power switch of the circuit device ON/OFF is turned on, the circuit device is power on but not working, the plurality of light-emitting devices L1~L6 are unable to emit light and flash further until the motion-actuated switch OS senses the motion of the object and generates the controlling signal accordingly. The controller 15 selectively drives the plurality of light-emitting devices L1~L6 to emit light and flash further according to the controlling signal.

Please refer to FIG. 4A to FIG. 4E. FIG. 4A to FIG. 4E are waveform diagrams of the various light-emitting conditions of the light-emitting devices L1~L6 emitting light in various periods.

Figure 4A:
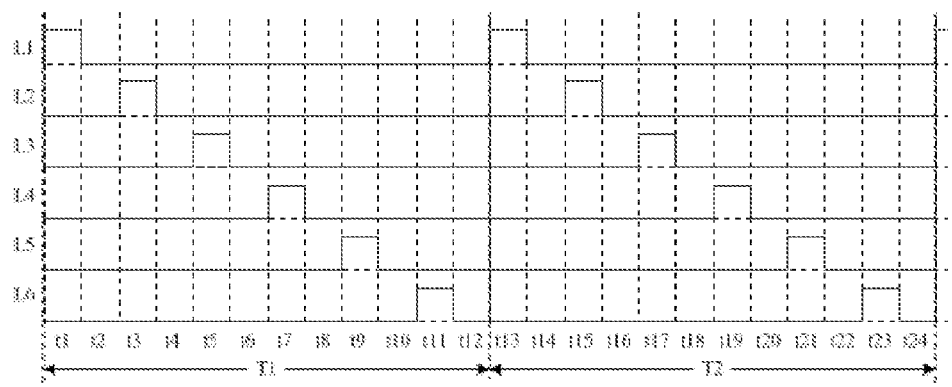
FIG. 4A to FIG. 4E are waveform diagrams of the various light-emitting conditions of the light-emitting devices L1~L6 emitting light in various periods.

As shown in FIG. 4A, when the motion-actuated switch 13 senses the first motion of the object and generates the first controlling signal accordingly, the controller 15 selectively drives the plurality of light-emitting devices L1~L6 to emit light sequentially in the first period in accordance with the order of FIG. 4A and the flashing frequency according to the first controlling signal, wherein the flashing frequency is 22 Hz and the first period is 1.7 second, that is the first light-emitting section of the plurality of light-emitting devices L1~L6. When the motion-actuated switch 13 senses the second motion of the object after the first period and generates the second controlling signal accordingly, the controller 15 selectively drives the plurality of light-emitting devices L1~L6 to emit light in the second period in accordance with the order of FIG. 4A and the flashing frequency according to the second controlling signal, wherein the flashing frequency slows down to 5 Hz and the first period remain 1.7 second, that is the second light-emitting section of the plurality of light-emitting devices L1~L6.

Figure 4B:
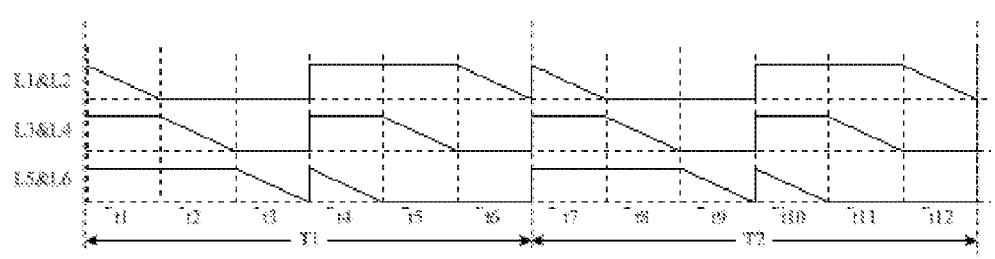

Next, when the motion-actuated switch 13 senses the third motion of the object after the second period and generates the third controlling signal accordingly, the controller 15 selectively drives the plurality of light-emitting devices L1~L6 to emit light in the third period in accordance with the order of FIG. 4B according to the third controlling signal. In the other words, the light-emitting devices L1 and L2 only emit light in the fade-out way in a time section t1. The light-emitting devices L3 and L4 only emit light in the fade-out way in a time section t2. The light-emitting devices L5 and L6 only emit light in the fade-out way in a time section t3. The light-emitting devices L1~L4 only emit light continuously and the light-emitting devices L5 and L6 emit light in the fade-out way in a time section t4. The light-emitting devices L1 and L2 emit light continuously and the light-emitting devices L3 and L4 emit light in the fade-out way and the light-emitting devices L5 and L6 do not emit light in a time section t5. The light-emitting devices L1 and L2 emit light in the fade-out way and the light-emitting devices L3~L6 do not emit light in a time section t6.

Figure 4C:
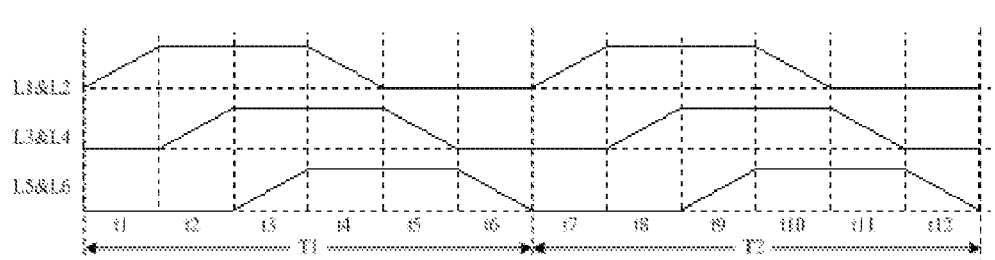

Next, when the motion-actuated switch 13 senses the fourth motion of the object after the third period and generates the fourth controlling signal accordingly, the controller 15 selectively drives the plurality of light-emitting devices L1~L6 to emit light in the fourth period in accordance with the order of FIG. 4C according to the fourth controlling signal, wherein the time of the fourth period is equal to the time of the third period, but not be limited.

As shown in FIG. 4C, the light-emitting devices L1 and L2 emit light in the fade-in way and the light-emitting devices L3~L6 do not emit light in the time section t1. The light-emitting devices L1 and L2 emit light continuously and the light-emitting devices L3 and L4 emit light in the fade-in way and the light-emitting devices L5 and L6 do not emit light in the time section t2. The light-emitting devices L1~L4 emit light continuously and the light-emitting devices L5 and L6 emit light in the fade-in way in the time section t3. The light-emitting devices L1 and L2 emit light in the fade-out way and the light-emitting devices L3~L6 emit light continuously in the time section t4. The light-emitting devices L1 and L2 do not emit light and the light-emitting devices L3 and L4 emit light in the fade-out way and the light-emitting devices L5 and L6 emit light continuously in the time section t5. The light-emitting devices L5 and L6 emit light in the fade-out way and the light-emitting devices L1~L4 do not emit light in the time section t6.

Figure 4D:
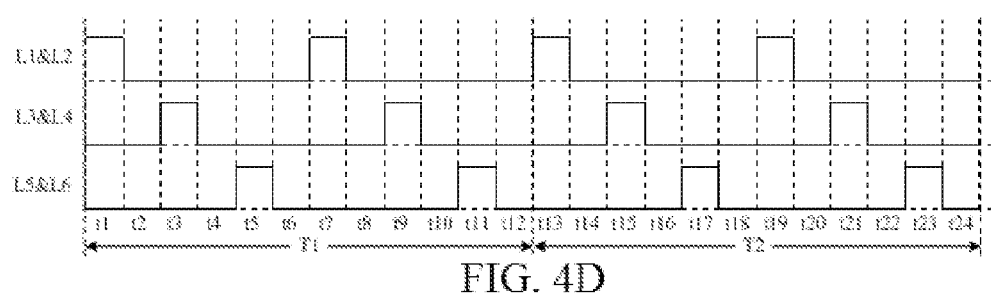

Next, when the motion-actuated switch 13 senses the fifth motion of the object after the fourth period and generates the fifth controlling signal accordingly, the controller 15 selectively drives the plurality of light-emitting devices L1~L6 to emit light in the fifth period in accordance with the order of FIG. 4D according to the fifth controlling signal, wherein the time of the fifth period is equal to the time of the third period, but not be limited. Similarly, when the motion-actuated switch 13 senses the sixth motion of the object after the fifth period and generates the sixth controlling signal accordingly, the controller 15 selectively drives the plurality of light-emitting devices L1~L6 to emit light in the sixth period in accordance with the order of FIG. 4E according to the sixth controlling signal, wherein the time of the sixth period is equal to the time of the third period, but not be limited.

Figure 4E:
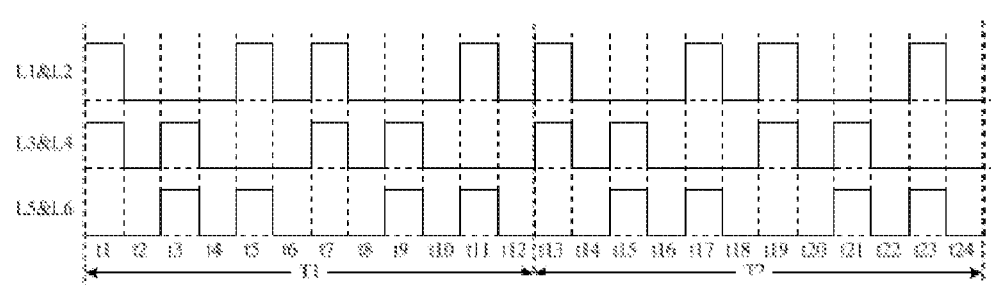
Figure 5A:
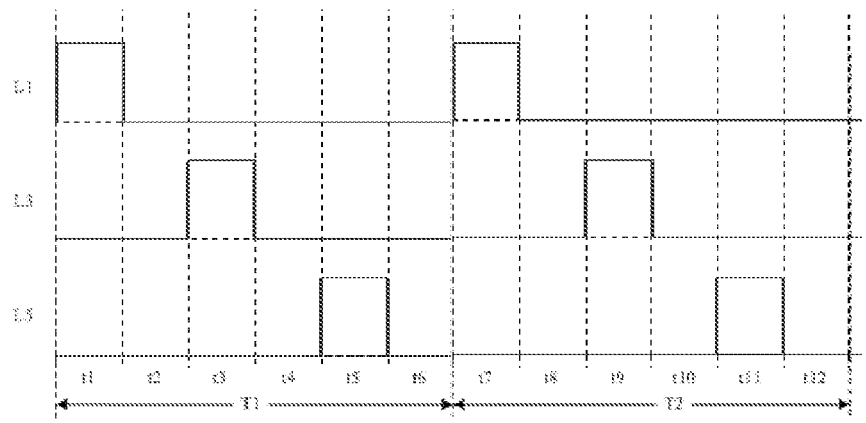
FIG. 5A to FIG. 5E are waveform diagrams of the various light-emitting conditions of the light-emitting devices L1, L3, L5 emitting light in various periods.
Figure 5B:
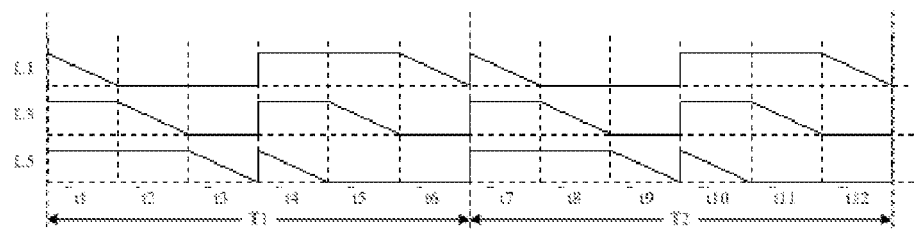
Figure 5C:
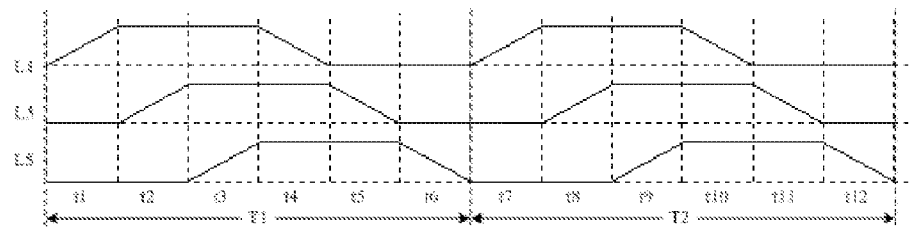
Figure 5D:
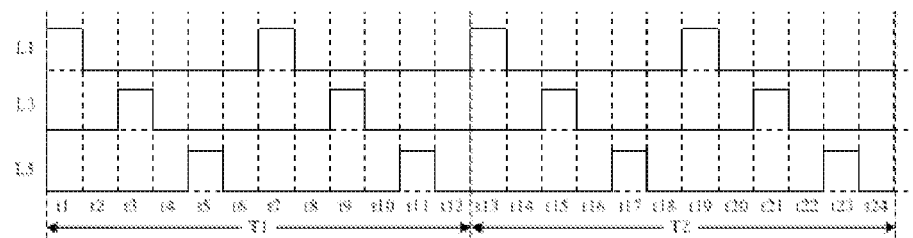
Figure 5E:
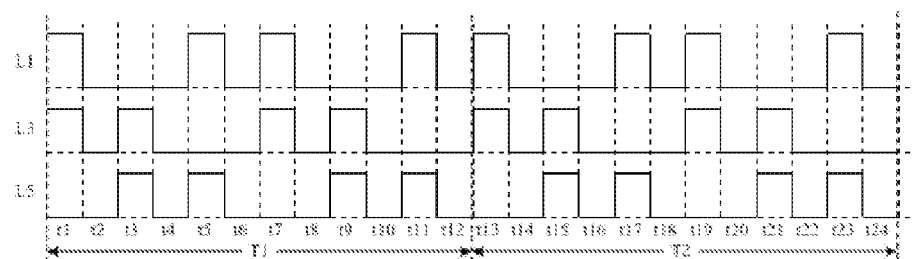

It should be noted that, comparison with FIG. 4D and FIG. 4E, there is at most one light-emitting devices group, such as L1 and L2, L3 and L4 or L5 and L6, emitting light at each of the time sections of FIG. 4D, but there are two light-emitting devices groups emitting light simultaneously at some of the time sections of FIG. 4E, whereby the circuit device generates various flashing visual effects.

In addition, in practice, a red light emitting diode, a green light emitting diode and a blue light emitting diode of the plurality of light-emitting devices are able to package in a light-emitting devices group, and the controller 15 controls the red light emitting diode, the green light emitting diode and the blue light emitting diode to emit light simultaneously at the first period, whereby the circuit device generates a light-mixed effect.

In the embodiment, the controller 15 is able to control the light-emitting condition of all of the plurality of light-emitting devices L1~L6 or part of the plurality of light-emitting devices L1~L6 according to a selecting signal generated by the selector 12. Therefore, it is hypothesized that the controller 15 controls only the light-emitting devices L1, L3 and L5 to emit light, the waveform diagrams of the light-emitting conditions are shown in FIG. 5A to FIG. 5E. In addition, the number of the sections for emitting light for the plurality of light-emitting devices L1~L6 are able to be changed according to actual needs, that is not limited in the embodiment.

In another embodiment, as shown in FIG. 4A, when the motion-actuated switch 13 senses the motion of the object and generates the first controlling signal accordingly, the controller 15 selectively drives the plurality of light-emitting devices L1~L6 to emit light sequentially in the first period in accordance with the order of FIG. 4A and the flashing frequency according to the first controlling signal, wherein the flashing frequency is 22 Hz and the first period is 1.7 second, that is the first light-emitting section of the plurality of light-emitting devices L1~L6. When the motion-actuated switch 13 senses the motion of the object again after the first period and generates the first controlling signal accordingly, the controller 15 selectively drives the plurality of light-emitting devices L1~L6 to emit light in the second period in accordance with the order of FIG. 4A and the flashing frequency according to the first controlling signal, wherein the flashing frequency slows down to 5 Hz and the first period remain 1.7 second, that is the second light-emitting section of the plurality of light-emitting devices L1~L6. Next, when the motion-actuated switch 13 senses the motion of the object after the second period again and generates the first controlling signal accordingly, the controller 15 selectively drives the plurality of light-emitting devices L1~L6 to emit light in the third period in accordance with one of the order of FIG. 4B~E according to the first controlling signal, wherein the order and the waveform can be pre-saved in the controller 15 from one of FIG. 4B~E, but also be selected from one of FIG. 4B~E by the controller 15. And then, when the motion-actuated switch 13 senses the motion of the object again and generates the first controlling signal accordingly, the controller 15 selectively drives the plurality of light-emitting devices L1~L6 to emit light again in accordance with the order of FIG. 4A and the flashing frequency according to the first controlling signal, wherein the flashing frequency slows down to 5 Hz, and so on.

Figure 6:
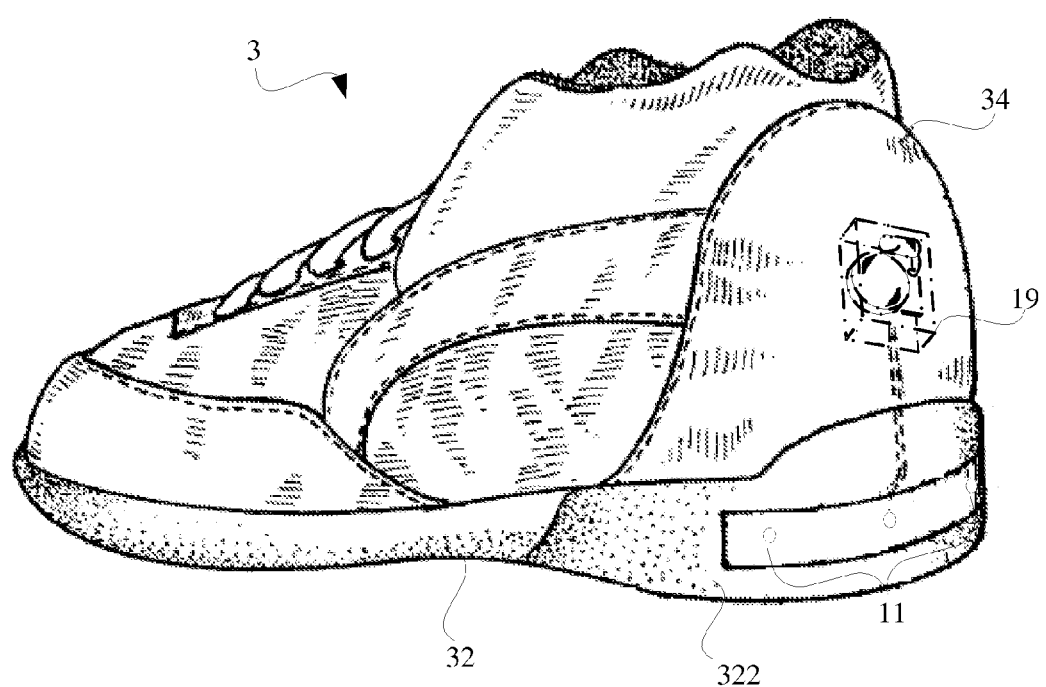
FIG. 6 illustrates the circuit device of the invention disposed in a shoe.
Figure 7:
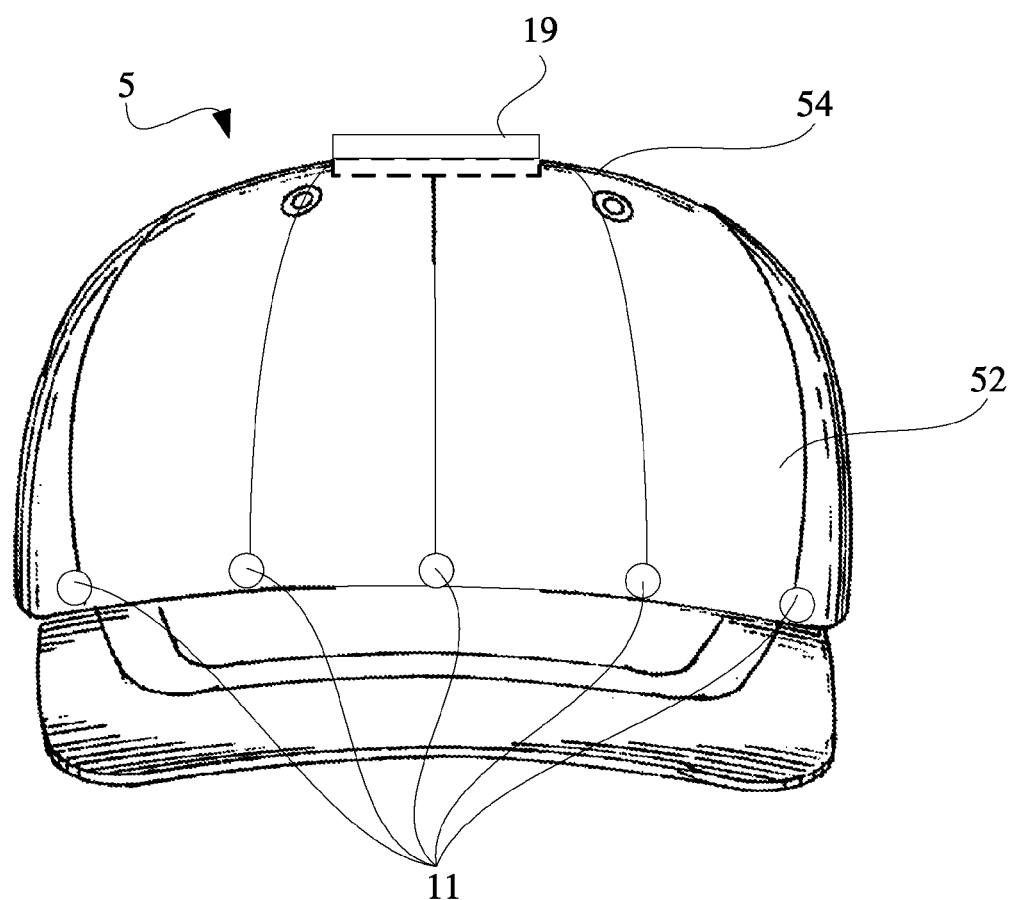
FIG. 7 is a front view of the circuit device of the invention disposed in a hat.

In practice, the said object is able to be a shoe, a clothes, a bag, a backpack, a hat or other objects able to be embedded in. FIG. 6 and FIG. 7 illustrate the circuit device of the invention disposed in a shoe 3 and a hat 5 separately. As shown in FIG. 6, the light-emitting devices group 11 is disposed in a heel position 322 of a shoe bottom 32, and the water-proof enclosure 19 and the component inside are disposed in a back position 34 of the shoe 3. When the user wearing the shoe 3 walks or runs, the motion-actuated switch of the circuit device is able to trigger the controller 15, the controller 15 drives the light-emitting devices group 11 to emit light. And, when the user wearing the shoe 3 walks or runs at night, the light-emitting devices group 11 is able to generate a powerful and secure light.

As shown in FIG. 7, the light-emitting devices group 11 is disposed in a front 52 of the hat 5, and the water-proof enclosure 19 and the component inside are disposed in a top 54 of the hat 5. When the user wearing the hat 5 processes, the motion-actuated switch of the circuit device is able to trigger the controller, the controller 15 drives the light-emitting devices group 11 to emit light. It will be seen from the said examples, the circuit device of the present invention is able to be applied easily to any object in need and generates a powerful and arresting light for enhancing security or fun.

In comparison with the prior art, the circuit device disclosed by the present invention is capable of controlling a plurality of light-emitting devices to emit light sequentially in accordance with various orders and various light flashing frequencies by a way of programmable design, and further controlling a part of the plurality of light-emitting devices to emit light sequentially in accordance with a order and a light flashing frequency according to the need of the user in various condition, which enhances the light emitting diodes to emit light in various ways. Moreover, the circuit device is close and simple, therefore the circuit device is capable of providing a strong light with saving energy, which meets the environmental protection trend for saving energy.

Although the present invention has been illustrated and described with reference to the preferred embodiment thereof, it should be understood that it is in no way limited to the details of such embodiment but is capable of numerous modifications within the scope of the appended claims.

What is claimed is:

1. A circuit device, embedded in an object, comprising:
   a plurality of light-emitting devices;
   a motion-actuated switch, sensing a first motion of the object and generating a first controlling signal accordingly;
   a controller, coupled to the motion-actuated switch and the light-emitting devices, the controller selectively driving the plurality of light-emitting devices to emit light in a first period in accordance with a first order and a first flashing frequency according to the first controlling signal, the motion-actuated switch sensing a second motion of the object after the first period and generating a second controlling signal accordingly, the controller selectively driving the plurality of light-emitting devices to emit light in a second period in accordance with the first order and a second flashing frequency according to the second controlling signal, the second flashing frequency different from the first flashing frequency, the motion-actuated switch sensing a third motion of the object after the second period and generating a third controlling signal accordingly, the controller selectively driving a plurality of light-emitting groups respectively comprising two light-emitting devices to emit light in a third period in accordance with a second order and a third flashing frequency according to the third controlling signal, after the third period, the motion-actuated switch sensing the motion of the object and generating the first controlling signal accordingly, the controller selectively driving the plurality of light-emitting devices to emit light in the first period in accordance with the first order and the first flashing frequency according to the first controlling signal; and a selector, coupled to the controller, generating a selecting signal to the controller, the controller selectively controlling the number of the light-emitting devices to emit light in the first period and the second period according to the selecting signal;

wherein the motion-actuated switch does not have any effect even if the motion-actuated switch senses the motion of the object in the first period, the second period and the third period.

2. The circuit device of claim 1, wherein the plurality of light-emitting devices comprise a first light-emitting device, a second light-emitting device, a third light-emitting device, a fourth light-emitting device, a fifth light-emitting device and a sixth light-emitting device, the first order means the light-emitting order from the first light-emitting device, the second light-emitting device, the third light-emitting device, the fourth light-emitting device, the fifth light-emitting device to the sixth light-emitting device in the first period and the second period.

3. The circuit device of claim 1, wherein the plurality of light-emitting groups comprise a first light-emitting group, a second light-emitting group and a third light-emitting group, the second order means the light-emitting order from the first light-emitting group, the second light-emitting group to the third light-emitting group in the third period.

4. The circuit device of claim 3, wherein the first light-emitting group, the second light-emitting group and the third light-emitting group orderly emit light in the fade-in or fade-out way in the third period.

5. The circuit device of claim 3, wherein the third period comprises a plurality of time sections, the controller selectively control at least one of the first light-emitting group, the second light-emitting group and the third light-emitting group to emit light in at least one of the plurality of the time sections.

6. The circuit device of claim 1, wherein the motion-actuated switch generates the first controlling signal again after the third period when the motion-actuated switch senses a fourth motion of the object, the controller selectively drives the plurality of light-emitting devices to emit light in the first period in accordance with the first order and the first flashing frequency according to the first controlling signal.

7. The circuit device of claim 1, further comprising an oscillation input, an oscillation output and an external oscillation resistor, the external oscillation resistor coupled to the oscillation input and the oscillation output for speeding up the flashing frequency built-in the circuit device.

8. The circuit device of claim 1, further comprising a power switch, when the power switch is turned on, the circuit device is power on but no working until the controller controls the plurality of light-emitting devices to flash.

9. A circuit device, embedded in an object, comprising:
a plurality of light-emitting devices;
a motion-actuated switch, sensing a motion of the object and generating a first controlling signal accordingly;
a controller, coupled to the motion-actuated switch and the light-emitting devices, the controller selectively driving the plurality of light-emitting devices to emit light in a first period in accordance with a first order and a first flashing frequency according to the first controlling signal, the motion-actuated switch sensing the motion of the object after the first period and generating the first controlling signal accordingly, the controller selectively driving the plurality of light-emitting devices to emit light in a second period in accordance with a second order and a second flashing frequency according to the second controlling signal, the second flashing frequency different from the first flashing frequency, the motion-actuated switch sensing the motion of the object after the second period and generating the first controlling signal accordingly, the controller selectively driving a plurality of light-emitting groups respectively comprising two light-emitting devices to emit light in a third period in accordance with a third order and a third flashing frequency according to the first controlling signal; and
a selector, selectively coupled to the plurality of light-emitting devices, generating a electing signal to the controller according to a state for the plurality of light-emitting devices selectively coupled to the selector, the controller selectively controlling the number of the light-emitting devices to emit light in the first period and the second period according to the selecting signal;
wherein the motion-actuated switch does not have any effect even if the motion-actuated switch senses the motion of the object in the first period, the second period and the third period.

10. The circuit device of claim 9, wherein when one of the light-emitting devices is coupled to the selector, the controller controls the coupled light-emitting device unable to emit light in the first period and the second period.

11. The circuit device of claim 10, wherein the controller controls the coupled light-emitting device to emit light in the third period in accordance with the third order and the third flashing frequency.

12. The circuit device of claim 9, wherein the motion-actuated switch senses the motion of the object after the third period and generates the first controlling signal accordingly, the controller selectively drives the plurality of light-emitting devices to emit light in the first period in accordance with the first order and the first flashing frequency according to the first controlling signal.

* * * * *